US011203254B2

(12) United States Patent
Fortin et al.

(10) Patent No.: US 11,203,254 B2
(45) Date of Patent: Dec. 21, 2021

(54) FRAMELESS WINDOW REGULATOR RAIL WITH OVER-MOLDED FUNCTIONAL EDGE

(71) Applicant: MAGNA CLOSURES INC., Newmarket (CA)

(72) Inventors: Raymond Edward Fortin, Newmarket (CA); Michael Bayley, Unionville (CA)

(73) Assignee: MAGNA CLOSURES INC., Newmarket (CA)

(*) Notice: Subject to any disclaimer, the term of this patent is extended or adjusted under 35 U.S.C. 154(b) by 73 days.

(21) Appl. No.: 16/552,384

(22) Filed: Aug. 27, 2019

(65) Prior Publication Data

US 2020/0070630 A1    Mar. 5, 2020

Related U.S. Application Data

(60) Provisional application No. 62/723,735, filed on Aug. 28, 2018.

(51) Int. Cl.
| | | |
|---|---|---|
| *E05F 11/38* | (2006.01) | |
| *B60J 1/17* | (2006.01) | |
| *E05F 15/689* | (2015.01) | |
| *B60J 5/04* | (2006.01) | |

(52) U.S. Cl.
CPC .............. *B60J 1/17* (2013.01); *B60J 5/0419* (2013.01); *E05F 15/689* (2015.01); *E05Y 2900/55* (2013.01)

(58) Field of Classification Search
CPC .... B60J 1/17; B60J 5/0419; B60J 1/00; E05F 11/382; E05F 15/689; E05F 11/488; E05F 11/385; E05Y 2900/55; E05Y 2201/684; E05D 15/165; E05D 15/18; E05D 15/24

USPC .......... 49/348, 352, 502, 324, 331, 332, 349
See application file for complete search history.

(56) References Cited

U.S. PATENT DOCUMENTS

| | | | | |
|---|---|---|---|---|
| 5,809,690 | A | * | 9/1998 | Due ....................... A44B 19/16 47/30 |
| 5,809,695 | A | * | 9/1998 | Strickland ............. E05F 11/488 49/352 |
| 5,960,588 | A | | 10/1999 | Wurm et al. |
| 6,516,493 | B1 | | 2/2003 | Seliger et al. |
| 7,640,697 | B2 | | 1/2010 | Florentin et al. |
| 7,877,932 | B2 | | 2/2011 | Kriese et al. |
| 8,096,080 | B2 | | 1/2012 | Pavlovic et al. |
| 8,595,978 | B2 | | 12/2013 | Rietdijk |
| 8,776,438 | B2 | | 7/2014 | Pleiss et al. |
| 8,839,566 | B2 | | 9/2014 | Deschner |

(Continued)

FOREIGN PATENT DOCUMENTS

| | | |
|---|---|---|
| DE | 102010063562 A1 | 6/2012 |
| EP | 1200279 A1 | 5/2002 |

*Primary Examiner* — Chi Q Nguyen
(74) *Attorney, Agent, or Firm* — Dickinson Wright PLLC

(57) ABSTRACT

A window regulator module for a motor vehicle includes a pair of window regulator rails operably coupled to one another via at least one cable wrapped about pulleys on the window regulator rails. Each window regulator rail has a body extending lengthwise between opposite ends. The body has a main body portion and a guide edge along which a lifter travels upwardly and downwardly. The main body portion is plastic and the guide edge is metal. The metal guide edge provides the window regulator module with increased stiffness and increased cross-vehicle stability to a window carried by the lifters.

21 Claims, 13 Drawing Sheets

(56) References Cited

U.S. PATENT DOCUMENTS

| | | | |
|---|---|---|---|
| 8,844,199 B2* | 9/2014 | Scharf | E05F 11/483 |
| | | | 49/352 |
| 9,677,312 B2 | 6/2017 | Marsh et al. | |
| 2008/0005971 A1* | 1/2008 | Dickie | E05F 15/689 |
| | | | 49/349 |
| 2008/0222962 A1* | 9/2008 | Staser | E05F 11/488 |
| | | | 49/502 |
| 2008/0236049 A1* | 10/2008 | Arimoto | E05F 11/382 |
| | | | 49/352 |
| 2011/0023367 A1* | 2/2011 | Barr | B60J 5/0416 |
| | | | 49/349 |
| 2013/0283697 A1* | 10/2013 | Galliot | E05F 11/488 |
| | | | 49/352 |
| 2014/0103683 A1* | 4/2014 | Giddens | B60J 1/2094 |
| | | | 296/152 |
| 2015/0275560 A1* | 10/2015 | Yamamoto | B60J 1/17 |
| | | | 49/352 |
| 2015/0322706 A1* | 11/2015 | Yamamoto | E05F 11/488 |
| | | | 49/349 |
| 2017/0089111 A1 | 3/2017 | Hazon et al. | |
| 2018/0094468 A1* | 4/2018 | Stewart | E05D 15/165 |
| 2018/0354349 A1 | 12/2018 | Fortin et al. | |
| 2019/0078366 A1 | 3/2019 | Lu et al. | |

* cited by examiner

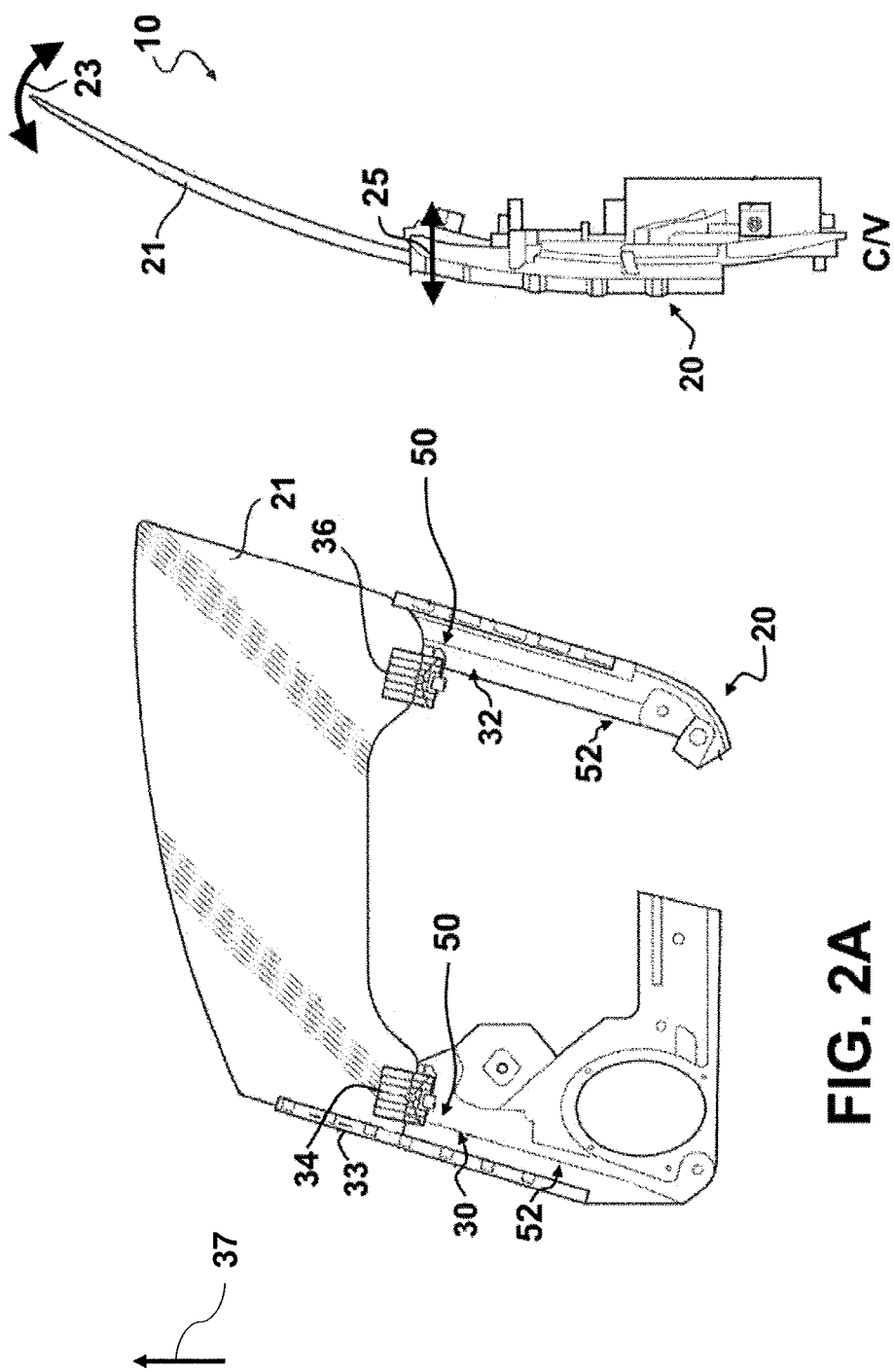

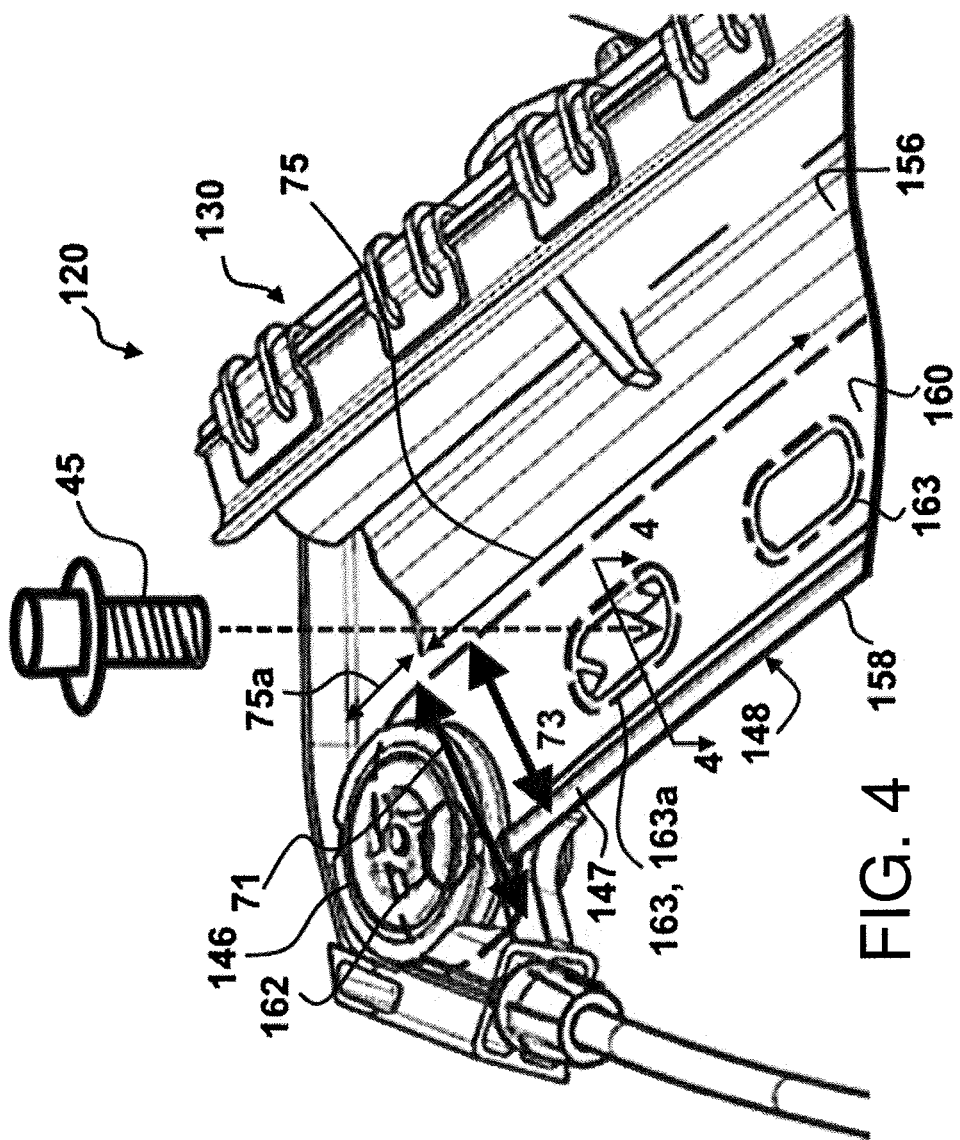

FRAMELESS WINDOW REGULATOR RAIL WITH OVER-MOLDED FUNCTIONAL EDGE

CROSS-REFERENCE TO RELATED APPLICATION

This application claims the benefit of U.S. Provisional Application Ser. No. 62/723,735, filed Aug. 28, 2018, which is incorporated herein by way of reference in its entirety.

FIELD

The present disclosure relates generally to vehicle door assemblies, and more particularly to window regulator rails for guiding a window between open and close positions.

BACKGROUND

This section provides background information related to the present disclosure which is not necessarily prior art.

In many motor vehicle door assemblies, an outer sheet metal door panel and an inner sheet metal door panel are connected together to define an internal door cavity therebetween. An equipment module or sub-assembly, commonly referred to as a carrier module, or simply carrier, is often mounted to the inner door panel within the internal door cavity. The carrier typically functions to support various door hardware components, including window regulator rails configured to support lifter plates for selectively slidable movement therealong. The lifter plates are fixed to a window to cause the window to slide up and down therewith along the direction of guide channels within the window regulator rails.

In vehicles that require so-called "frameless" doors, such as commonly used on convertibles, the window regulator rails and lifter plates are typically bulky, heavy, complex metal components due to the need for the window to resist deflection. The ability of the window to resist flexing or bending deflection, such as while being placed under a load during a door closing/slamming event or in an up-stall condition, is important to avoid glass breakage or misalignment. As such, the carrier and the window regulator components, such as the window regulator rails and lifter plates, need to be robust and relatively stiff to withstand the forces and energy encountered during use, and to withstand the stresses and bending moments on the window regulator rails and lifter plates/glass interface. As such, the carrier, window regulator rails and lifter plates are typically formed of steel and heavy die-cast metal components in order to withstand the challenging environment of a frameless door. Unfortunately, the solid metal components are not only bulky and heavy, but are limited as to the geometry of their construction as well as being costly in manufacture.

In view of the above, there is a need to provide a carrier module and window regulator rails therefor, for a frameless door, that are relatively lightweight, able to be formed having an optimal geometry desired, while being economical in manufacture and assembly.

SUMMARY

This section provides a general summary of the disclosure and is not intended to be considered a complete and comprehensive listing of the disclosure's full scope or all of its aspects, advantages, objectives and/or features.

In accordance with one aspect of the disclosure, the present disclosure is directed to a window regulator module for a motor vehicle. The window regulator module includes a pair of window regulator rails operably coupled to one another via at least one cable wrapped about pulleys on each window regulator rail. Each window regulator rail has a body extending lengthwise between opposite first and second ends. At least one or both of the bodies has a main body portion and a guide edge along which a lifter travels upwardly and downwardly. The main body portion is plastic and the guide edge is metal. The metal guide edge functions, among other things, to provide the window regulator module with increased stiffness and increased cross-vehicle stability to a window carried by the lifters, thereby reducing the potential for damage and/or misalignment to the window, while also enhancing the movement of the window between raised and lowered positions.

In accordance with another aspect of the disclosure, the guide edge can have a first region extending outwardly from the main body portion in exposed fashion and a second region concealed and encapsulated by the main body portion, such that the lifters can slide along the exposed first region with minimal friction and the concealed second region can be configured to provide enhanced stiffness and cross-vehicle stability as desired.

In accordance with another aspect of the disclosure, the main body portion of the window regulator rail can be over-molded about the second region of the guide edge, thereby being bonded directly to the guide edge during molding without need for secondary fixation mechanisms, thereby resulting in economical manufacture and precise tolerances of the finished window regulator module.

In accordance with another aspect of the disclosure, the guide edge can be configured and located to extend along a full length of the window regulator rail along which the lifter travels.

In accordance with another aspect of the disclosure, a pulley in the window regulator rail can have a hub extending through a through opening in the guide edge, thereby enhancing stiffness and stability of the pulley and the region of the window regulator rail supporting the pulley.

In accordance with another aspect of the disclosure, the guide edge can be entirely encapsulated by the main body portion.

In accordance with another aspect of the disclosure, the guide edge can be configured to extend along less than a full length of the window regulator rail along an edge region which the lifter travels, wherein the guide edge can be entirely encapsulated by the main body portion to avoid any bumps or seams between the guide edge and the main body along the edge region.

In accordance with another aspect of the disclosure, the guide edge can be roll formed, thereby resulting in economical manufacture thereof.

In accordance with another aspect of the disclosure, the guide edge can be disposed in a mold cavity and the main body portion of the window regulator rail can be over-molded about at least a portion of the guide edge.

In accordance with another aspect of the disclosure, a door assembly for a motor vehicle is provided. The door assembly includes an outer panel, an inner panel, and a window regulator module. The window regulator module includes a pair of window regulator rails operably coupled to one another via at least one cable wrapped about pulleys on each window regulator rail. Each window regulator rail has a body extending lengthwise between opposite first and second ends. The body has a main body portion and a guide edge along which a lifter travels upwardly and downwardly. The main body portion is plastic and the guide edge is metal.

The metal guide edge functions to provide the window regulator module with increased stiffness and increased cross-vehicle stability to a window carried by the lifters.

In accordance with another aspect of the disclosure, the door assembly can include a carrier attached to the window regulator module.

In accordance with another aspect, the disclosure is directed to a window regulator rail for a window regulator module of a motor vehicle. The window regulator rail includes a body extending lengthwise between opposite first and second ends. The body has a main body portion and a guide edge along which a lifter, configured for operable attachment to a window, travels upwardly and downwardly. The main body portion is plastic and the guide edge is metal.

In accordance with another aspect, the disclosure is directed to a method of constructing a window regulator rail for a window regulator module of a motor vehicle. The method includes providing a metal guide edge along which a lifter, configured for operable attachment to a window, travels upwardly and downwardly. Further, molding a plastic main body portion in bonded relation to the metal guide edge and forming the plastic main body portion to extend lengthwise between opposite first and second ends, with the metal guide edge extending along at least a portion of the length of the plastic main body portion along which the lifter travels.

In accordance with another aspect of the disclosure, the method can further include providing the metal guide edge having a first region and a second region and over-molding the second region with the plastic main body portion to fix, conceal and encapsulate the second region with the plastic main body portion, with the first region of the metal guide edge extending outwardly in exposed fashion from the plastic main body portion.

In accordance with another aspect of the disclosure, the method can further include providing the first region of the metal guide edge extending along a full length of the window regulator rail along which the lifter travels.

In accordance with another aspect of the disclosure, the method can further include over-molding the entirety of the metal guide edge with the plastic main body portion to fix, conceal and encapsulate the entirety of the metal guide edge with the plastic main body portion.

In accordance with another aspect of the present disclosure, there is provided a window regulator rail for a window regulator module of a closure member of a motor vehicle, including a body extending lengthwise between opposite upper first and lower second ends, the body having a main body portion and a guide edge extending from the upper first end towards the lower second end along an upper partial length of the body, along which a lifter configured for operable attachment to a window, travels upwardly and downwardly, the main body portion being plastic and the guide edge being metal.

In accordance with yet another aspect, there is provided a method of constructing a window regulator rail for a window regulator module configured to be installed on a closure member of a motor vehicle, including the steps of providing a metal guide edge along which a lifter, configured for operable attachment to a window, travels upwardly and downwardly, and molding a plastic main body portion in bonded relation to the metal guide edge and forming the plastic main body portion to extend lengthwise between opposite upper first and lower second ends, with the metal guide edge extending from the upper first end towards the lower second end along at least a portion of a length of the plastic main body portion along which the lifter travels.

Further areas of applicability will become apparent from the description provided herein. The description and specific examples in this summary are only intended to illustrate certain non-limiting embodiments which are not intended to limit the scope of the present disclosure.

BRIEF DESCRIPTION OF THE DRAWINGS

These and other aspects, features, and advantages of the present disclosure will be readily appreciated, as the same becomes better understood by reference to the following detailed description when considered in connection with the accompanying drawings wherein:

FIGS. 2A and 2B illustrate a plan view and a side view respectively of a window regulator module of the door assembly of FIG. 1 constructed in accordance with one aspect of the disclosure;

FIG. 4 is a view similar to FIG. 3 of a window regulator rail of a window regulator module constructed in accordance with another aspect of the disclosure;

DETAILED DESCRIPTION OF EXAMPLE EMBODIMENTS

Figure 1:
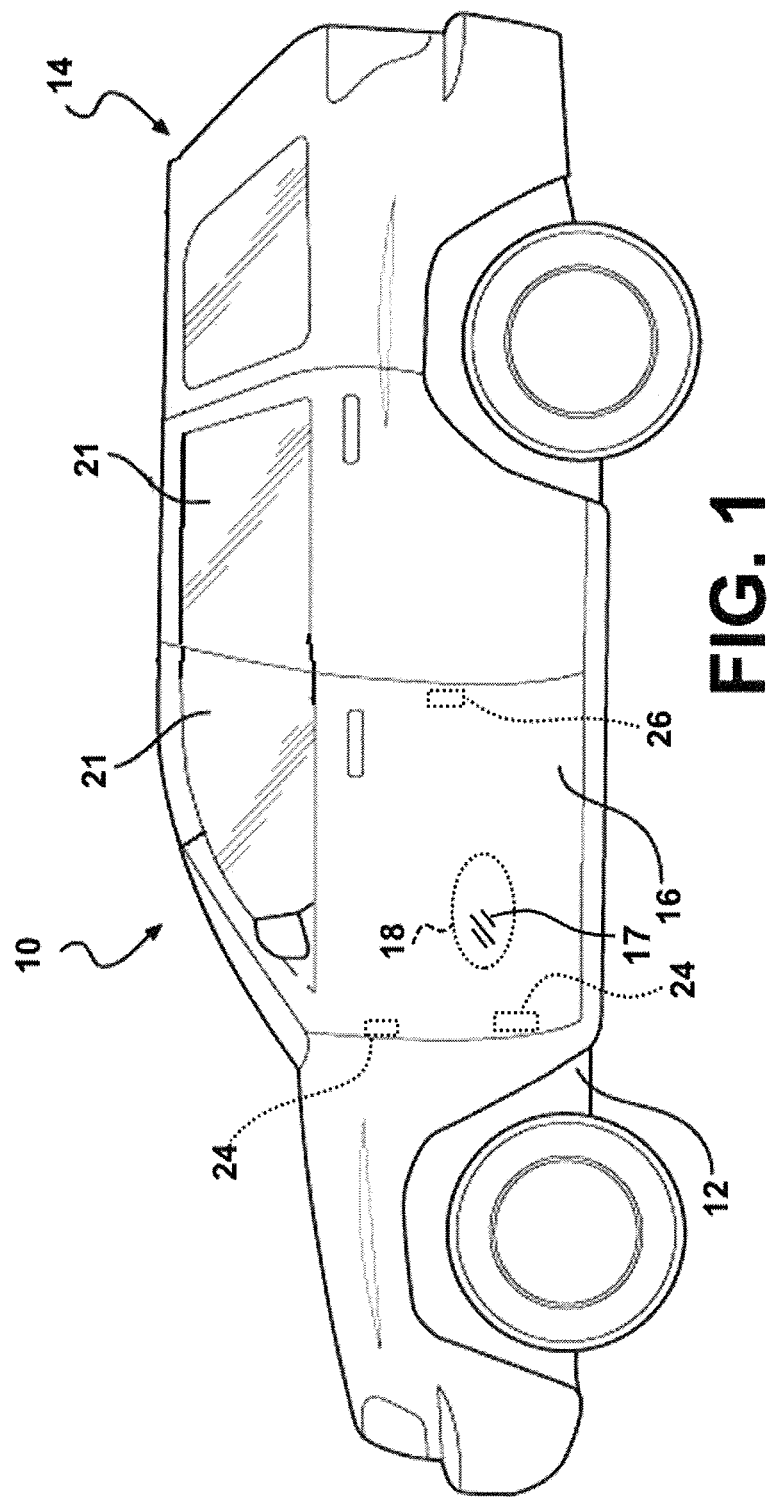
FIG. 1 illustrates a motor vehicle with a door assembly.

In general, example embodiments of a window regulator module constructed in accordance with the teachings of the present disclosure will now be disclosed. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail, as they will be readily understood by the skilled artisan in view of the disclosure herein.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Reference is made to FIG. 1, which shows a door assembly 10 mounted to a body 12 of a motor vehicle 14. The door assembly 10 includes, among other possible features that will be apparent to a skilled artisan, an outer panel 16 and an inner panel 17 defining a cavity 18 therebetween for receipt of a window regulator module 20 constructed in accordance with the disclosure therein. Window regulator module 20 functions to provide reliable movement of a window 21 upwardly, where the upward direction is illustrated as arrow 37 in FIG. 2A, in raising movement to a closed position and downwardly in lowering movement to an open position. Window regulator module 20 can include a carrier member, also referred to as carrier plate 22, attached thereto to form a unitary carrier module 19 to facilitate closing off an opening in the inner panel 17 of door assembly 10, if desired. The production, assembly and operation of the door assembly 10 is facilitated and enhanced directly as a result of the configuration of the window regulator module 20, as discussed further hereafter, and as will be readily appreciated by one skilled in the art upon viewing the disclosure herein.

The outer panel 16 forms at least part of the exterior surface of the door assembly 10. The inner panel 17 provides a structural member for the mounting of one or more trim pieces that form an inner surface of the door assembly 10. Some of the inner panel 17 may itself also form part of the inner surface of the door assembly 10, if desired. The outer panel 16 and inner panel 17 are connected together to provide a door panel structure that forms the internal door cavity 18 that contains various components of the door assembly 10, including at least a portion of the carrier module 19. To facilitate assembly of the components into the cavity 18, the inner panel 17 can be formed having at least one opening (now shown), by way of example and without limitation, as will be understood by a person possessing ordinary skill in the art of vehicle door assemblies.

The outer panel 16 and inner panel 17 may be made from any suitable material or combination of materials. For example, the outer and inner panels 16, 17 may both be made from a suitable metal (e.g. a suitable steel). In another example, the outer panel 16 may be made from a suitable polymeric or composite material (e.g. fiberglass) and the inner panel may be made from a suitable metal, by way of example and without limitation.

A pair of hinges 24 are connected to door panel structure and pivotally mount a front side edge of door assembly 10 to the vehicle body 12. A door latch 26 is mounted adjacent a rear side edge of door panel structure to permit the releasable closure of door assembly 10 against vehicle body 12. Hinges 24 and door latch 26 act as force transfer members through which forces in door assembly 10 are transmitted to vehicle 14. Such forces include, for example, side-impact forces from another vehicle or object colliding with the vehicle 14.

Figure 1A:
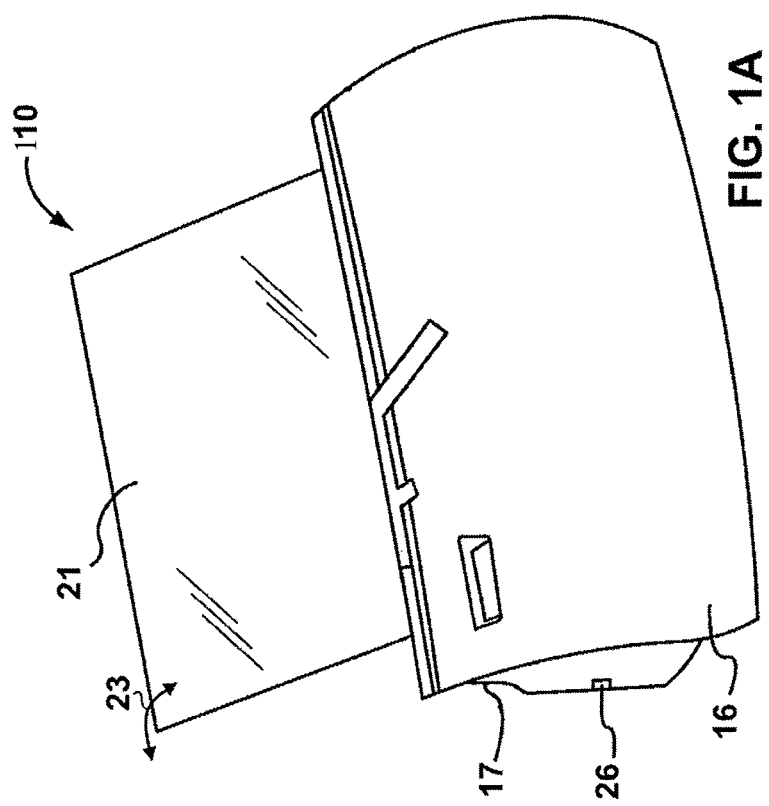
FIG. 1A illustrates a frameless door assembly, in accordance with one aspect of the disclosure.

FIG. 1A illustrates door assembly 10 configured as a frameless door assembly, whereby the window 21 is not bounded by a frame extending from the door panel structure for example from outer panel 16 and/or an inner panel 17 such that when the window 21 is in the closed position the window 21 may be sealed against the against vehicle body 12 when the door assembly 10 is latched against vehicle body 12 or shut. When the window 21 is in the closed position, that is extending fully upwards as shown in FIG. 1A and FIGS. 2A, 2B, and the door assembly 10 is released from against vehicle body 12 or open, the window 21 is not bounded by a supporting frame such that bending force 23 of the window 21 may result in stress on the window regulator components as will now be described in more exemplary detail different than stresses experience during opening and closing the window 21. Another example of a frameless door assembly is illustrated in commonly owned US patent application No. 20190078366, entitled "Light weight two piece frameless door module with adjustment features", the entire content of which is incorporated herein by reference.

Figure 2:
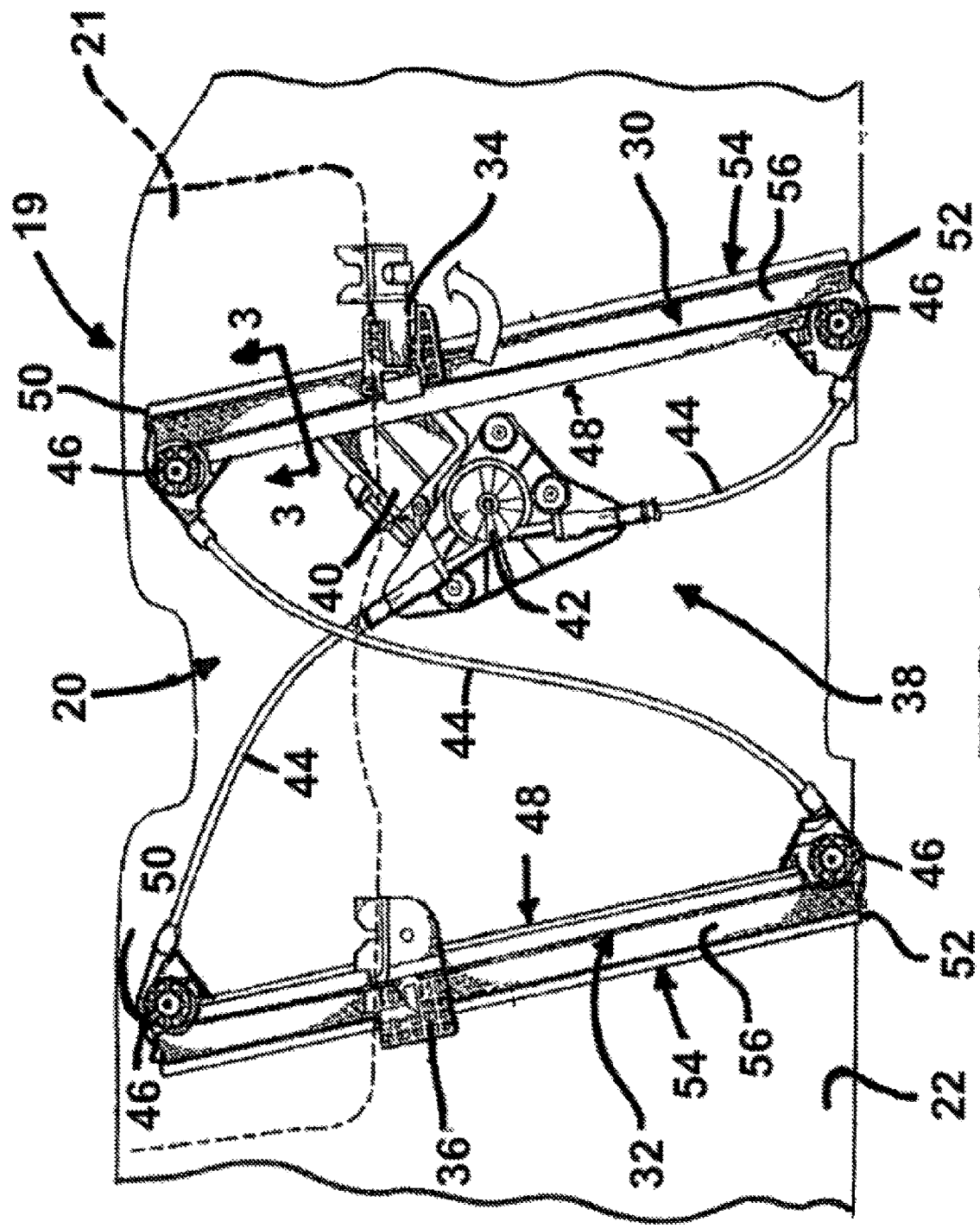
FIG. 2 illustrates a window regulator module of the door assembly of FIG. 1 constructed in accordance with one aspect of the disclosure.
Figure 2C:
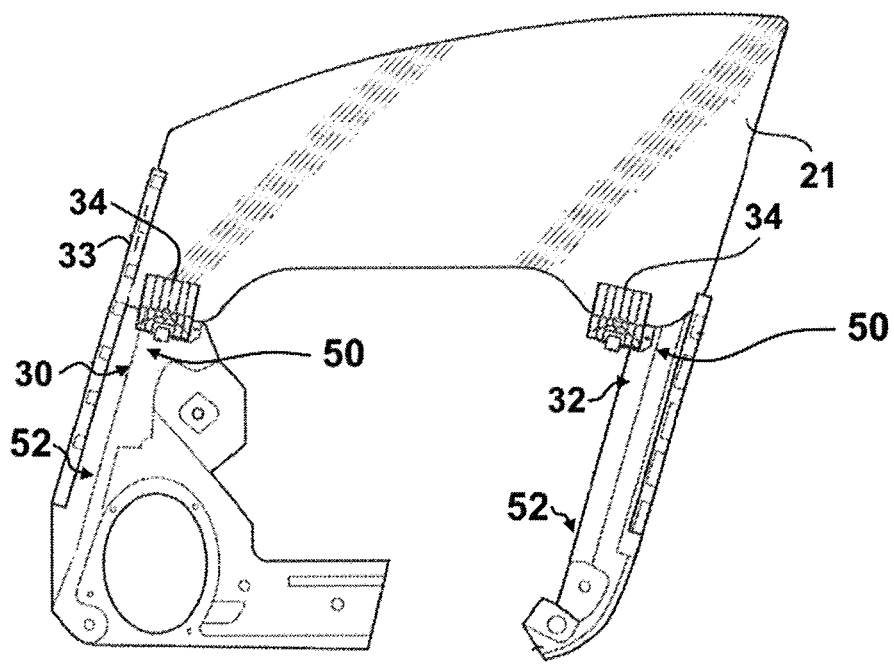
FIG. 2C illustrates a plan view of a window regulator module of the door assembly having a glass run channel, constructed in accordance with another aspect of the disclosure.

The movement of the window 21 between the open and closed positions is carried out by the window regulator module 20 (FIG. 2). The window regulator module 20 includes a pair of window regulator rails, also referred to as window regulator guide rails or simply guide rails, including a first guide rail 30, which may be referred to as a front guide rail 30, a second guide rail 32, which may be referred to as a rear guide rail 32, a first lifter 34, which may be referred to as a front lifter 34, a second lifter 36, which may be referred to as a rear lifter 36, and a cable drive assembly 38. Each guide rail 30, 32 has one of the lifters 34, 36 thereon. The lifters 34, 36 are movable up and down along the guide rails 30, 32 between an upper position, which corresponds to the closed position of the window 21, and a lower position, which corresponds to the open position of the window 21. The lifters 34, 36 are shown in FIG. 2 in an intermediate position somewhere between their upper and lower positions. The lifters 34, 36 are shown in FIGS. 2A and 2B in accordance with another example of a window regulator module 20 at the upper ends 50 of the guide rail 30, 32 corresponding to the open position of the window 21 where the guide rail 30, 32 would be subjected to a higher bending or torsional loading 25, for example causing an inward or outward cross vehicle (C/V) bending of the upper ends 50 of the guide rail 30, 32, resulting from the force 23, for example due to the window 21 being allowed to move and not restrained against movement by a surrounding door frame in the example configuration where door assembly 10 is a frameless door assembly. The lifters 34, 36 are fixed to the window 21 for conjoint movement with the window 21 between the raised and lowered positions, and may be any suitable type of lifters known in the art. Referring now to FIG. 2C, there is illustrated an exemplary configuration of the door assembly 10 where the pair of window regulator rails 30, 32 includes a front window regulator rail 30 having a glass run channel 33 extending upwardly therefrom the front window regulator rail 30 for slidably receiving the window 21 and is not provided with a reinforcing guide edge as will be described in more details herein below, and a rear window regulator rail 32 provided with a reinforcing guide edge. Such a configuration may further increase weight savings since a user moving the door by grasping the top of the window 21 may occur at the most aftwards upper region of the window 21 (opposite the window 21 edge supported by the glass run channel 33) imparting a greater moment of force on the rear window regulator rail 32 compared to that experienced by the front window regulator rail 30, which is lesser due to the resistance to movement of the window 21 by the glass run channel 33.

The cable drive assembly 38 connects to the lifters 34, 36 and drives the lifters 34, 36 up and down along the guide rails 30, 32 between the upper, closed and lower, open positions, as is known in the art. The cable drive assembly 38 may be any suitable cable drive assembly known in the art. For example, the cable drive assembly 38 may include a motor 40, a cable drum 42, and a plurality of cables 44 that extend from the cable drum 42 around pulleys 46 or the like and connect to the lifters 34, 36. The cables 44 are wound and unwound from the cable drum 42 by driving rotation of the motor 40 to drive the lifters 34, 36 up and down along the guide rails 30, 32 so as to move the window 21 up and down between its closed and open positions, respectively, as is known in the art.

Figure 3:
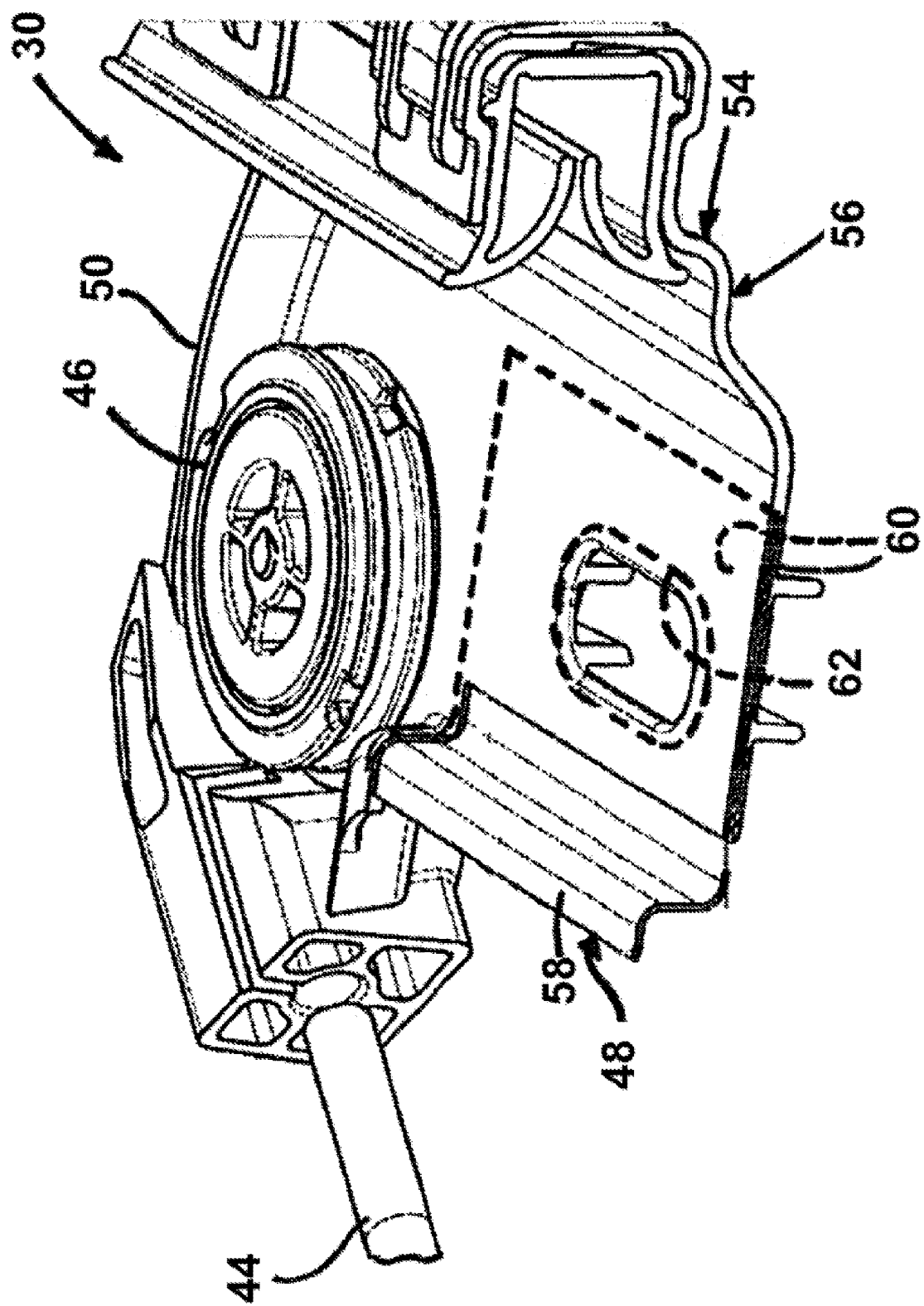
FIG. 3 is a cross-sectional view taken generally along the line 3-3 of a window regulator rail of the window regulator module of FIG. 2.

The guide rails 30, 32 are now discussed in further detail, with particular regard to functional guide edges thereof, referred to hereafter as guide edges 48, along which the lifters 34, 36 traverse upwardly and downwardly. Each guide rail 30, 32 has an elongate body 54 extending between opposite upper and lower ends 50, 52, with each body 54 having a main body portion 56 extending between the opposite ends 50, 52 and an associated guide edge 48 extending along at least a portion of the body 54. The main body portion 56 is constructed of a plastic material, such as in a molding process, by way of example and without limitation, while at least a portion or the entirety of the guide edge 48 is constructed of metal, such as in a rolling, stamping, or other suitable metal forming process. As shown in FIG. 3, the metal functional guide edge 48 can be provided having an exposed first region 58 and a second region 60 bonded to the main body portion 56, wherein the second region 60 is shown as being a concealed and covered in encapsulated fashion by plastic material of the main body portion 56. The guide edge 48 in the embodiment illustrated in FIGS. 2 and 3 extends continuously as a single piece of metal material along the full length of the respective guide rails 30, 32 from immediately adjacent the pulleys 46 located at the opposite ends 50, 52, though, as discussed hereafter, the guide edge 48 can be provided to extend further beyond the pulleys 46, or less than the entirety, or along a substantial entirety (intended to mean that although not extending the full length, that it extends to adjacent or immediately adjacent the opposite ends 50, 52) of the guide rails 30, 32.

Figure 4B:
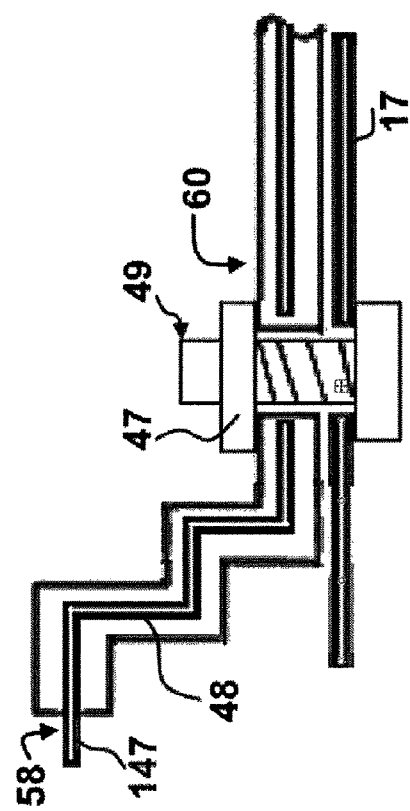
FIG. 4B is a cross sectional view of a window regulator rail similar to FIG. 4A, illustrating the window regulator rail having multiple parallel planes and secured to a panel of a closure member using a fastener coupled to one the parallel planes.
Figure 4A:
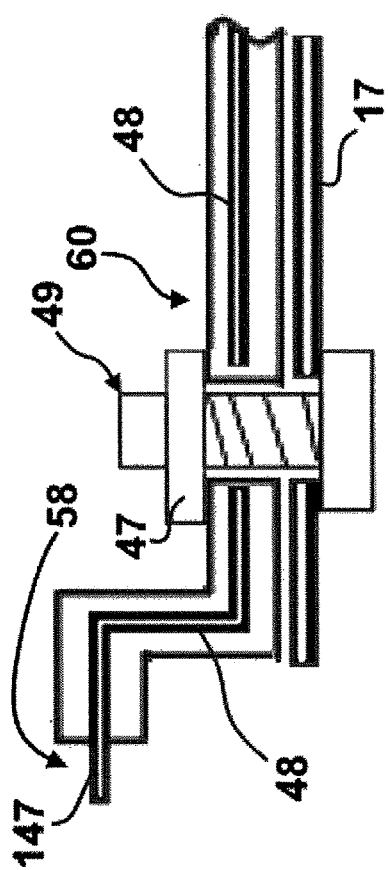
FIG. 4A is a cross sectional view of the window regulator rail of FIG. 4, taken along the line 4-4, illustrating the window regulator rail secured to a panel of a closure member using a fastener.

In construction, the guide edge 48 can first be formed having the desired length, geometry, including cross-sectional shape/contour, and any through openings 62 (FIG. 3) desired, such as may be needed for the passage of fasteners (not shown, but may include screws, bolts, rivets as examples) or for allowing passage of and interconnection of overmolded plastic material. Then, the plastic material of the main body portion 56 can be molded about the guide edge 48 to provide the exposed first region 58 (not covered by plastic material) and the concealed second region 60 (overmolded and covered by plastic material), such as in an over-molding process, by way of example and without limitation. Second region 60 may be provided with at least one through opening 62, 163 for receiving a portion of the over-molded main body portion. Corresponding through openings about through openings 62, 163 in the overmolded main body portion 56 may be provided for allowing the passage of fasteners through the through openings 62, 163. For example, and with reference to FIGS. 4 and 4A, second region 60 is configured to be secured to the closure member 10, for example directly secured to a sheet metal of the inner panel 17, by a fastener 45 extending through the through openings 62, 163 and being secured to the sheet metal of the inner panel 17, thereby urging a head 47 of the fastener 45 against the second region 60, and against the overmolded plastic covering second region 60 if second region 60 is exposed about the through openings 62, 163, to clamp second region 60 against the inner panel 17, thereby securing the guide edge 48 to the closure panel 10. With reference to FIG. 4B, the first region 58 and the second region 60 may extend in different planes relative to one another so as to provide clearance to the lifter 34 traveling along the guide edge 48 from any interference with the inner panel 17 as an example. As shown in FIG. 4, guide edge 48 is configured to extend away from a through opening 163*a* along an upper partial length 75 of said body 54, and for example may extend only downwardly, or both downwardly and upwardly away from a through opening 163*a* as shown in FIG. 4. Providing a metal second region 60 allows the securing or mounting connection robustness between the rails 30, 32 and the inner panel 17, and generally the closure panel 10, to be improved since main body portion is able to withstand higher clamping forces from the fastener 45 due to the provision of metal about the clamping/securing area compared to a fastening area of a rail only formed from plastic, as well as increase the strength of the area of the rails 30, 32 surrounding the through openings 62, 163 so as to be able to withstand forces applied to the rails 30, 32, such as by a user grasping the window 21 to impart a movement to the closure member 10, and to the fastening connection between the rails 30, 32 and the inner panel 17 caused by the movement of the window 21. Therefore the metal guide edge 48 is secured to the inner panel 17, and a plastic main body portion 56 without any metal reinforcing structure is not secured to the inner panel 17. The metal guide edge 48 may be secured to the inner panel 17 in other manners, for example first region 58 may be secured to the closure member 10, or another portion of the guide edge 48, for example extension 69 may be secured to the inner closure member 10. Accordingly, as will be appreciated by a person skilled in the molding art, no secondary adhesive or secondary fixation mechanism is needed to fix the guide edge 48 to the main body portion 56, as the plastic material of the main body portion 56 bonds with the guide edge 48 during the molding process.

With the guide edge 48 being formed a metal, reduced friction exists between the guide edge 48 and the lifters 34, 36 during movement of the lifters 34, 36 therealong, thereby facilitating the ease with which the window 21 can be raised and lowered, which in turn allows the size and power of the motor 40 to be reduced. Accordingly, enhanced design flexibility can be provided. Further, with the guide edge 48 being formed a metal, the rigidity of the guide rails 30, 32 is increased, thereby avoiding unwanted deflection of the window 21 and of the guide rails 30, 32 reducing fatigue damage over time, and thus, enhancing cross-vehicle stability of the window 21 and durability of the guide rails 30, 32. Further, with the main body portion 56 being constructed of plastic, economies are recognized, such as reduced cost of material and manufacture of the guide rails 30, 32, and further yet, reduced weight of the guide rails 30, 32 is attained, thereby enhancing fuel economy of the vehicle 14, and further yet, intricate shapes and contours can be attained, thereby further enhancing design flexibility.

Figure 5:
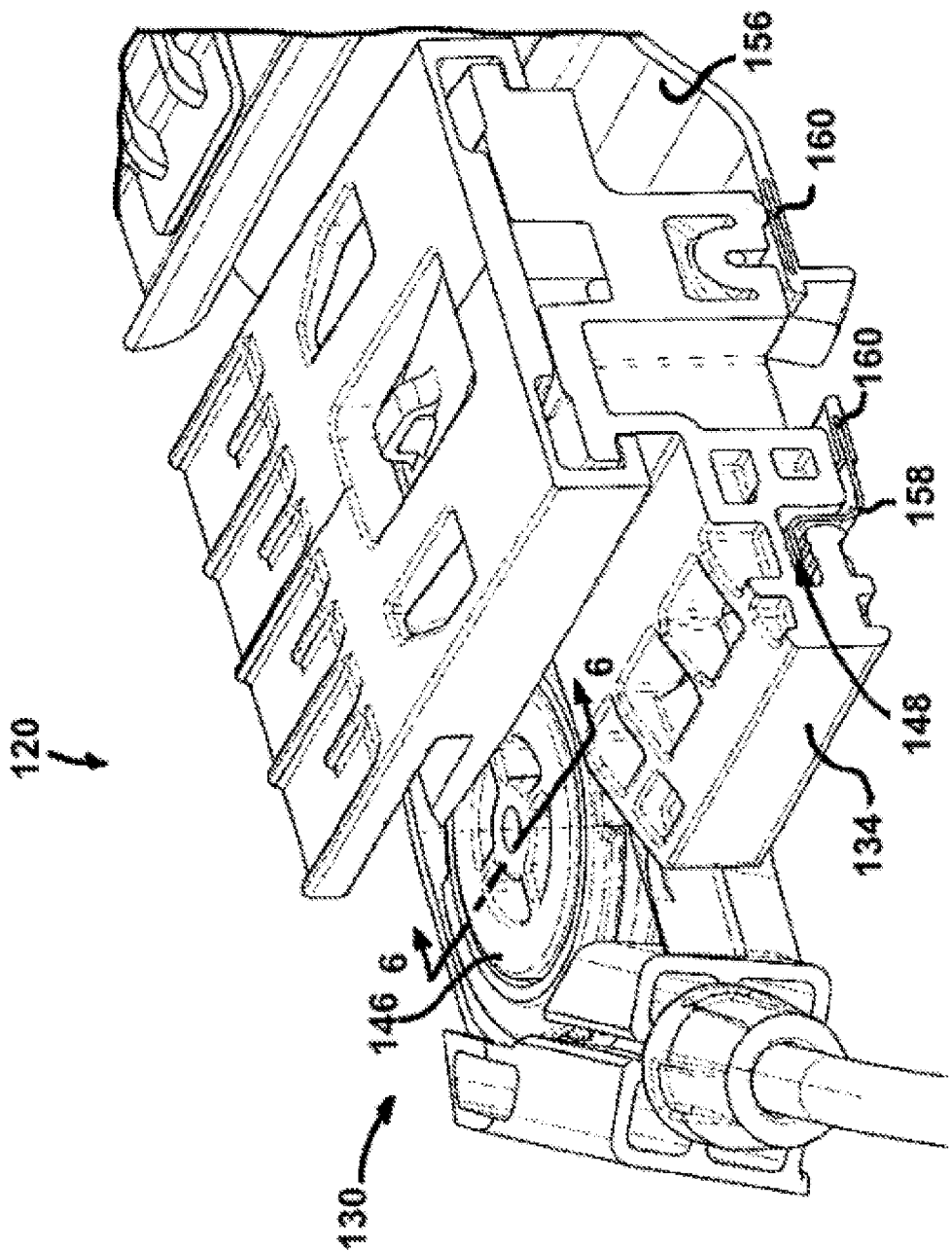
FIG. 5 is another cross-sectional view of the window regular module of FIG. 4.
Figure 6:
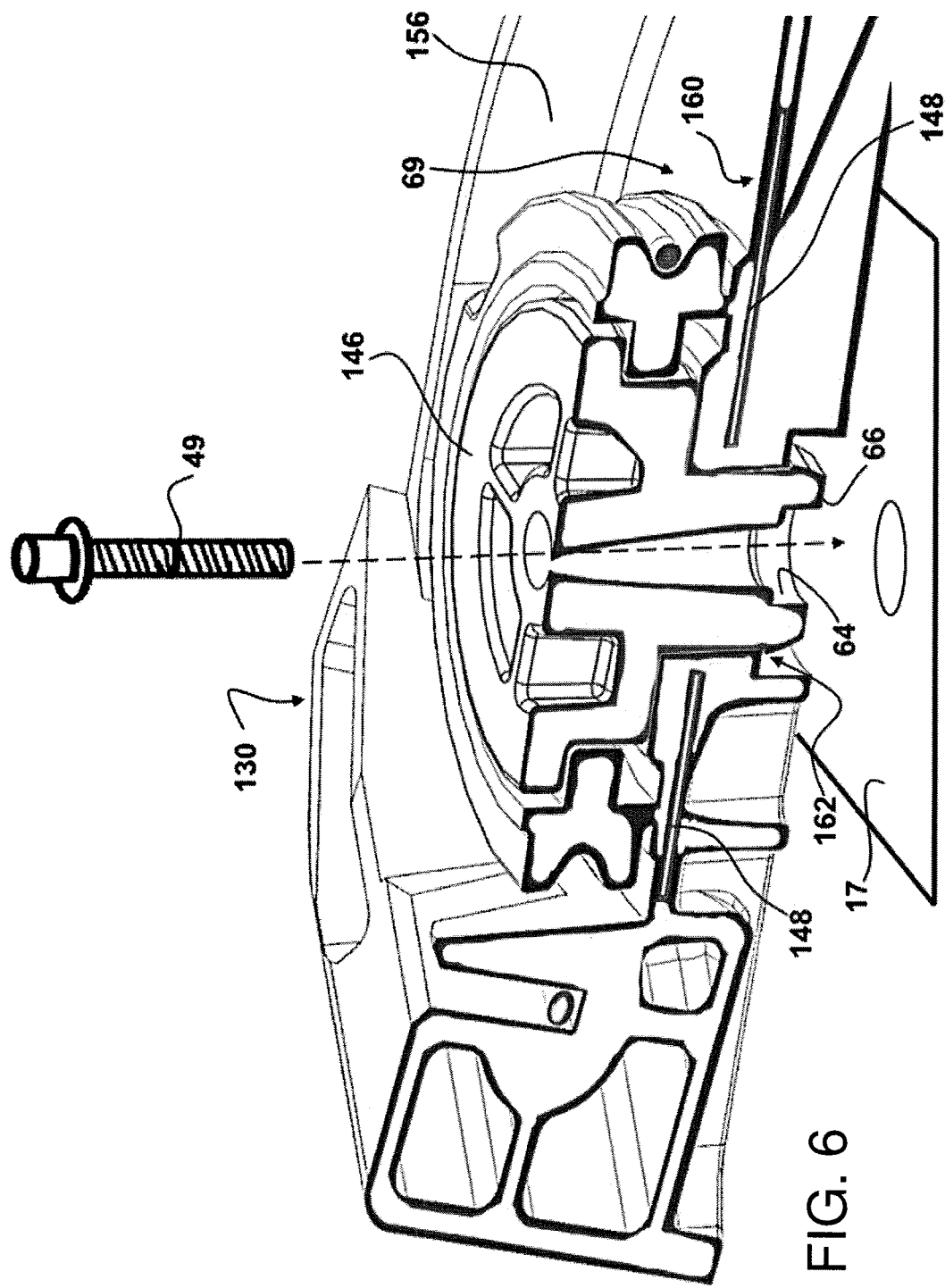
FIG. 6 is a cross-sectional view taken generally along the line 6-6 of the window regulator rail of FIG. 5.

In FIGS. 4-6, one guide rail 130 of a pair of guide rails of a window regulator module 120 constructed in accordance with another aspect of the disclosure is shown, wherein the same reference numerals as used above, offset by a factor of 100, are used to identify like features, with it to be understood that the discussion directed to guide rail 130 applies equally to the other guide rail (not shown).

Guide rail 130 is similar to guide rail 30, including a metal guide edge 148 and a plastic main body portion 156. The main body portion 156 can be molded to or about, such as in an over-molding process, a second region 160 of the metal guide edge 148, with a first region 158 remaining exposed and uncovered by plastic for upward and downward travel of a lifter 134 therealong (FIG. 5), as discussed above for metal guide edge 48. One notable difference of guide rail 130 is that the metal guide edge 148 extends beyond the pulleys 146, with an upper pulley 146 shown (best shown in FIGS. 4 and 6). Metal guide edge 148 may therefore include an upwardly extending extension 69, which does not function to support the lifter 134, formed from the same material as metal guide edge 148. Upwardly extending extension 69 may include a larger width 71 than a width 73 of the guide edge 148 along which the lifter 134 travels upwardly and downwardly illustratively shown as reference number 75 in FIG. 7, with the at least one pulley 146 is mounted to the upwardly extending extension 69.

Figure 7:
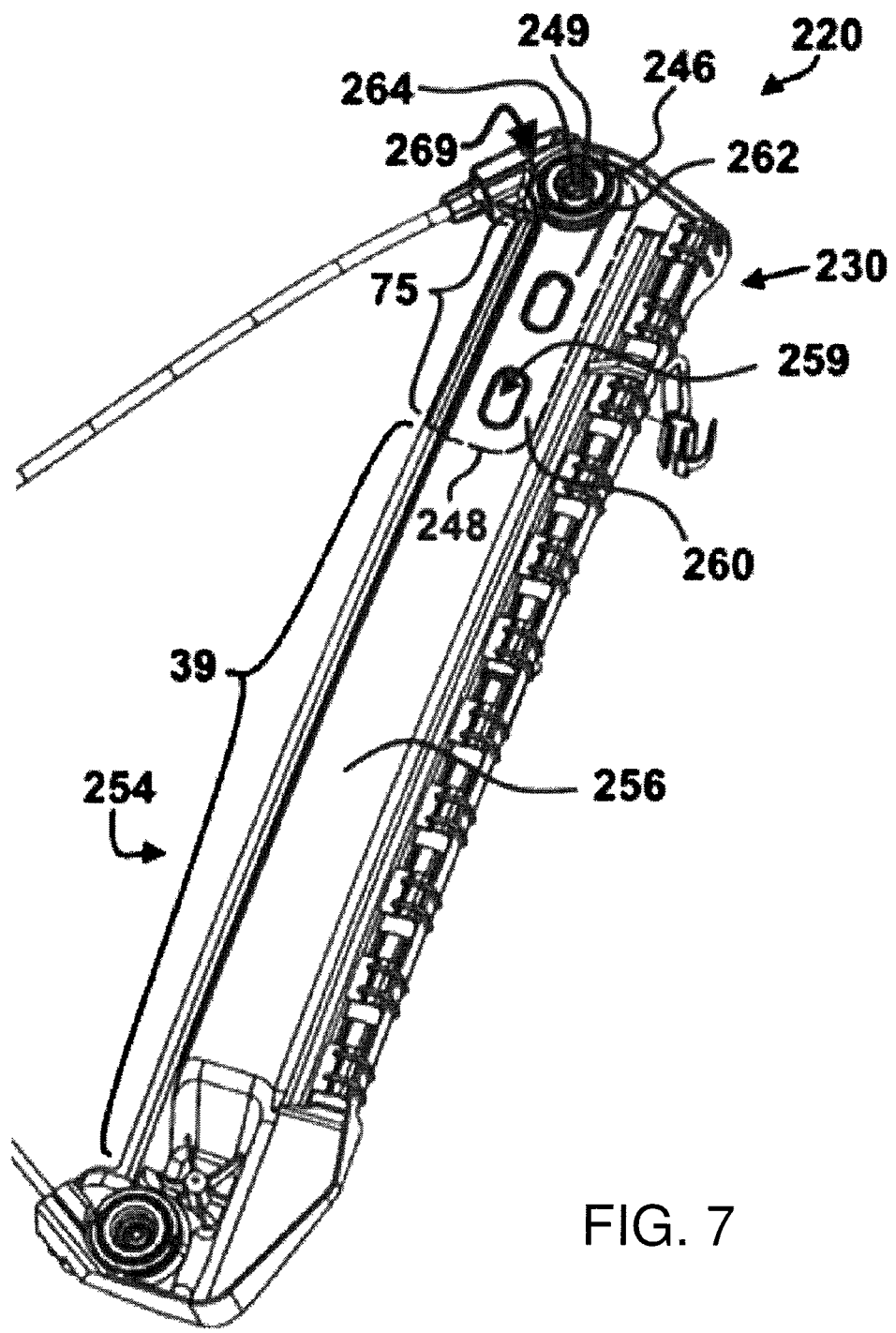
FIG. 7 is a perspective view of a window regulator rail of a window regulator module constructed in accordance with yet another aspect of the disclosure.

It is to be recognized that the guide edge 148 can extend in uninterrupted fashion beyond a lower pulley (not shown) as well. With the guide edge 148 extending beyond the pulleys 146, a hub 64 (FIG. 6) of the pulleys 146 can extend through a pre-formed through opening 162 in the guide edge 148, and for example a preformed through opening in the upwardly extending extension 69, to provide enhanced rigidity and support to the pulleys 146 and to the region of the guide rail 130 supporting the pulleys 146. In an illustrative configuration, the hub 64 and the through opening 162 may be aligned and are configured to receive a fastener 49 for securing the pulley 146 and the guide edge 48 to the closure member 10, and for example as shown in FIG. 6, fastener 49 is received through the hub 64 and the through opening 162 securing the pulley 146 and the extension 69 to the inner panel 17. In another illustrative example as shown in FIG. 7, at least one pulley 246 may be coupled to the body portion 254 for relative rotation therewith, the at least one pulley 246 having a hub 264 for receiving a fastener 249 extending through the hub 264 and a through opening 262 in the guide edge 248 for securing the pulley 246 to the guide edge 248, and for example the extension 269 of the guide edge 248. The guide edge 248 may be secured to the closure member 10 through another through opening, for example another through opening 259 provided on the second portion 260 of the guide edge 248.

Furthermore, pulleys 146 may be positioned offset on the upwardly extending extension 69 provided with the larger width 71, and for example pulleys 146 may be positioned offset from the functional edge 147 of metal guide edge 148 which the lifter 134 travels along providing improved pulley 146 positioning and cable angle adjustment relative to the lifter 34 and or other components such as the cable drum 42 if desired, as well as increasing the material, and for example the metal material, of the upwardly extending extension 69 for pulley 146 fixation or mounting support therewith to be able to resist against stall stresses and strains due to actuation of cable 44. In the embodiment illustrated, the main body portion 156 is shown molded to extend through the through opening 162, with a hub opening 66 being molded within the main body portion 156 for close, rotating receipt of the hub 64 therethrough, by way of example and without limitation. Accordingly, with the guide rail 130 extending beyond one or both pulleys 146, increased cross-vehicle stability is provided due to the support provided by the guide edge 148 supporting the pulley(s) 146. Otherwise, the guide rail 130 is the same as discussed for the guide rail 30, and thus, further discussion is believed unnecessary.

In FIG. 7, one guide rail 230 of a pair of guide rails of a window regulator module 220 constructed in accordance with yet another aspect of the disclosure is shown, wherein the same reference numerals as used above, offset by a factor of 200, are used to identify like features, with it to be understood that the discussion directed to guide rail 230 applies equally to the other guide rail.

Guide rail 230 is similar to guide rail 130, including a metal guide edge 248 and a plastic main body portion 256; however, rather than main body portion 256 being over-molded about a portion of the guide edge 248, the main body portion 256 is over-molded about the entirety of the guide edge 248, thereby encapsulating the entirety of the guide edge 248 with plastic material of the main body portion 256. Further yet, in accordance with another aspect, the guide edge 248 can be provided to extend along a select portion of the guide rail 230, less than the full length of the guide rail 230, if desired, shown as extending about a select region of the guide rail 230 from beyond the upper pulley 246, as discussed for guide rail 130, downwardly from the upper pulley 246 a relative short distance, such as about ¼ to ½ the full length of the guide rail 230, by way of example and without limitation, with other proportions being contemplated herein, such as up to about % the length or more. With the guide edge 248 being reduced in length relative the full potential travel of the lifter (not shown), and with the guide edge 248 being completely over-molded by the main body portion 256, any potential for bumps or seams where the guide edge 248 terminates is eliminated. Otherwise, the guide rail 230 is the same as discussed for the guide rail 130, and thus, further discussion is believed unnecessary.

Figure 8:
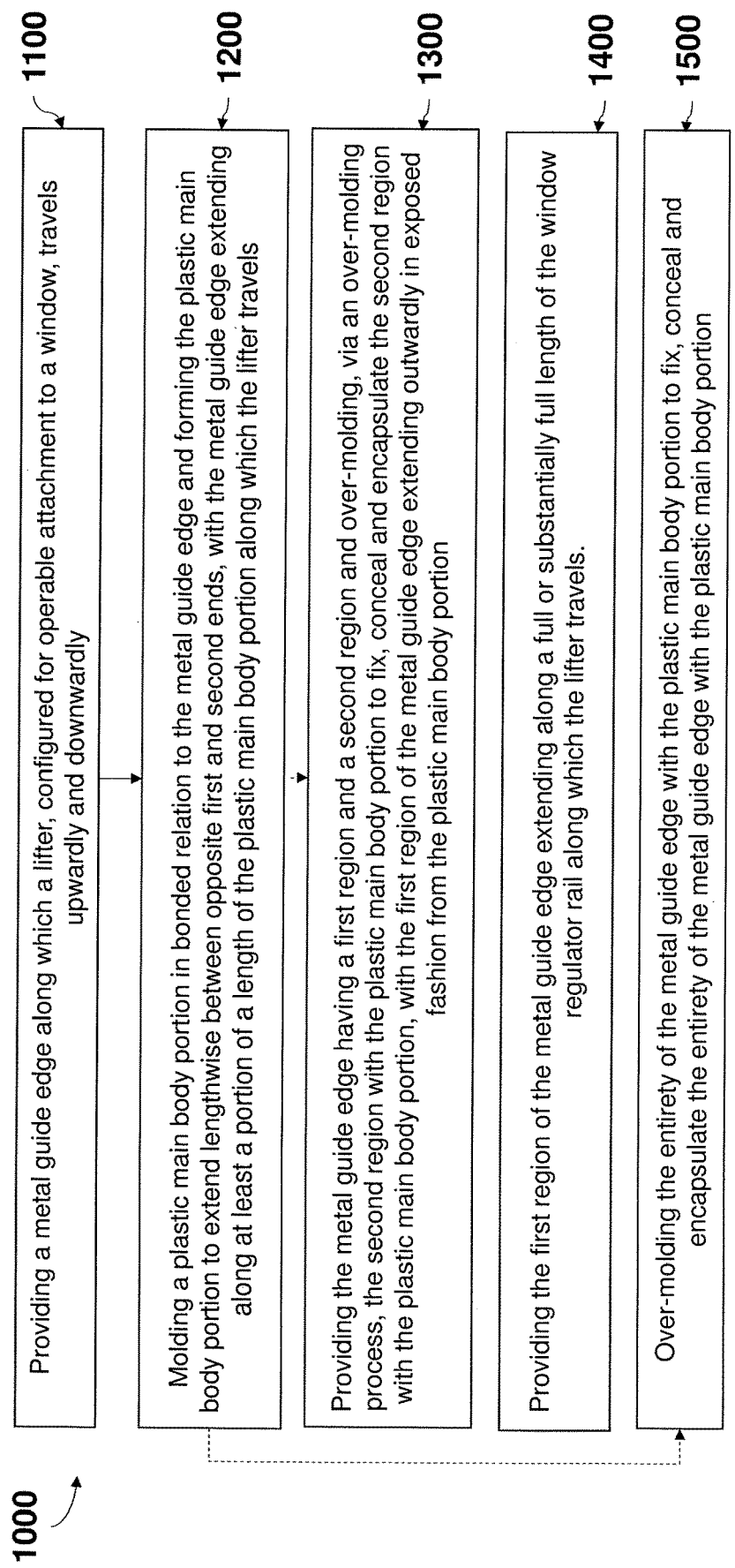
FIG. 8 is a flow diagram illustrating a method of constructing a window regulator rail for a window regulator module of a motor vehicle.

In accordance with another aspect of the disclosure, FIG. 8 illustrates a method 1000 of constructing a window regulator rail 30, 130, 230 for a window regulator module 20, 120, 220 of a motor vehicle 14. The method includes a step 1100 of providing a metal guide edge 48, 148, 248 along which a lifter 34, 36, configured for operable attachment to a window 21, travels upwardly and downwardly. Further, the method 1000 includes a step 1200 of molding a plastic main body portion 56, 156, 256 in bonded relation to the metal guide edge 48, 148, 248 and forming the plastic main body portion 56, 156, 256 to extend lengthwise between opposite upper first and lower second ends 50,52, with the metal guide edge 48, 148, 248 extending along at least a portion of the length of the plastic main body portion 56, 156, 256 along which the lifter 34, 36 travels. In the illustrated figures, the guide edge 48, 148, 248 is shown extending from the upper first end 50 towards said lower second end 52 over an upper partial length 75 of the main body portion 56, 156, 256 along which a lifter 34, 36 travels upwardly and downwardly which corresponds to the partial upper movement of travel of the window 21 whereat the moments caused by a force applied to the window 21 acting on the upper partial length 75 of the main body portion 56, 156, 256, for example due to a user moving the closure member 10 by grasping the top of the window 21, are greatest and which would cause a bending or deflection of the upper partial length 75 of the main body portion 56, 156, 256. The guide edge 48, 148, 248 provides reinforcement to the main body portion 56, 156, 256 only at this upper partial length 75, without further extending the metal reinforcement to lower partial lengths 39 whereat the moments caused by a force applied to the window 21 when the lifter 34, 36 travels upwardly and downwardly along lower partial lengths 39 would be sufficiently resisted by the main body portion 56, 156, 256 formed from only plastic. Therefore, weight, manufacturing and material costs associated with providing a metal reinforcement to the main body portion 56, 156, 256 provided along the entire of substantially entire length of the main body portion 56, 156, 256 is reduced and not required by the configuration of the guide edge 48, 148, 248 as described herein.

The method 1000 can further include a step 1300 of providing the metal guide edge 48, 148 having a first region 58, 158 and a second region 60, 160 and over-molding, via an over-molding process, the second region 60, 160 with the plastic main body portion (56, 156) to fix, conceal and encapsulate the second region 60, 160 with the plastic main body portion 56, 156, with the first region 58, 158 of the metal guide edge 48, 148 extending outwardly in exposed fashion from the plastic main body portion 56, 156.

The method 1000 can further include a step 1400 of providing the first region 58, 158 of the metal guide edge 48, 148 extending along a full or substantially full length (substantially is intended to mean that although it may be less than the full length, it extends between about 90-99 percent of the full length) of the window regulator rail 30, 130 along which the lifter 34, 36 travels.

The method 1000 can further include a step 1500 of over-molding the entirety of the metal guide edge 248 with the plastic main body portion 256 to fix, conceal and encapsulate the entirety of the metal guide edge 248 with the plastic main body portion 256. Although in this embodiment the metal guide edge 248 is not directly contacted by the lifter 34, 36, it increases the strength and rigidity of the plastic main body portion 256, thereby improving the performance of the window regulator rail 230 and the reliance that the lifter 34, 36 will travel in reliable fashion along the window regulator rail 230 to ensure the window 21 tracks along the desired path while traveling between its raised and lowered positions.

Figure 9:
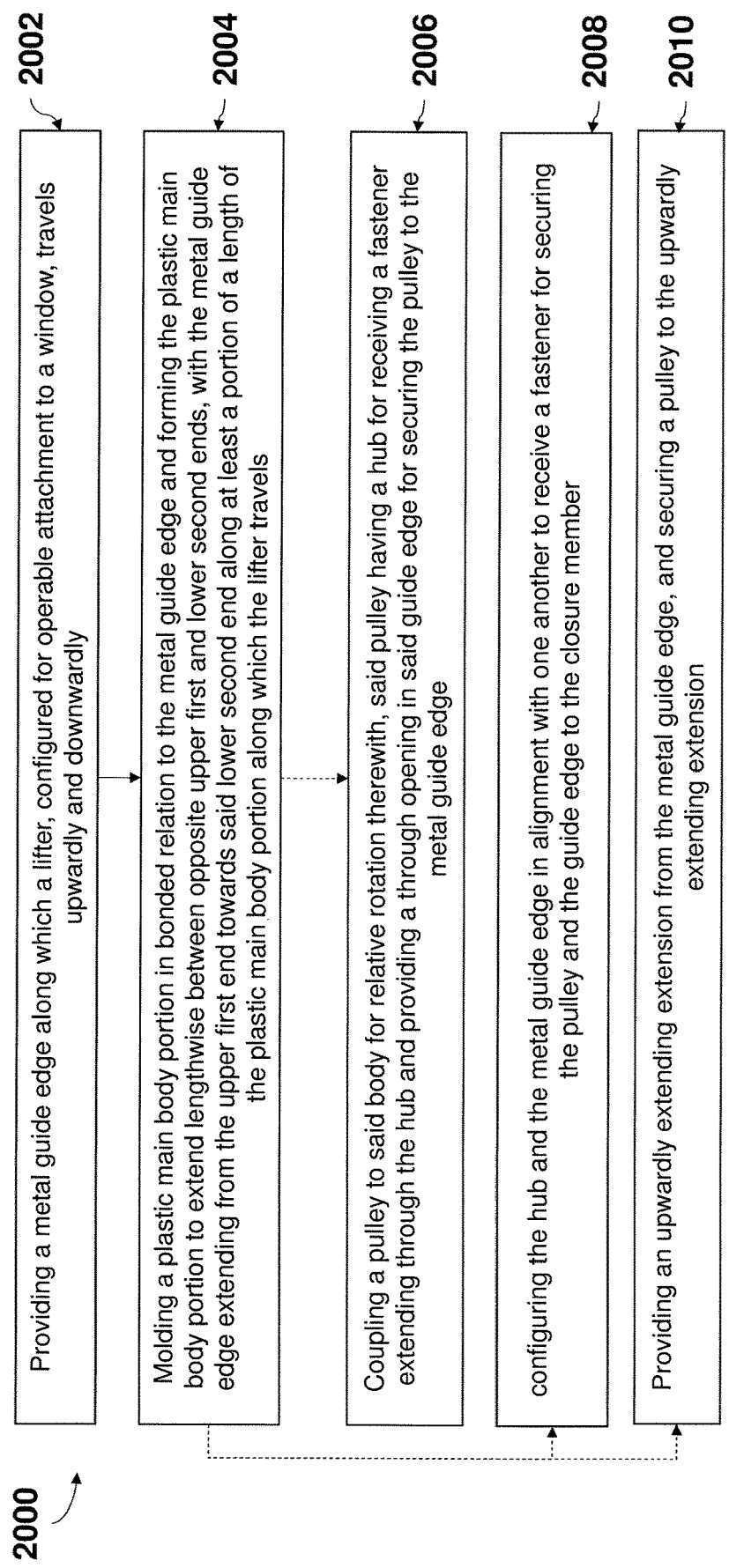
FIG. 9 is a flow diagram illustrating a method of constructing a window regulator rail for a window regulator module of a motor vehicle, in accordance with an illustrative embodiment of the present disclosure.

Now referring to FIG. 9, there is illustratively provided a method of constructing a window regulator rail for a window regulator module configured to be installed on a closure member of a motor vehicle 2000, the method 2000 including providing a metal guide edge along which a lifter, configured for operable attachment to a window, travels upwardly and downwardly 2002, and molding a plastic main body portion in bonded relation to the metal guide edge and forming the plastic main body portion to extend lengthwise between opposite upper first and lower second ends, with the metal guide edge extending from the upper first end towards said lower second end along at least a portion of a length of the plastic main body portion along which the lifter travels 2004. The method 2000 may further include coupling a pulley to the body for relative rotation therewith, the pulley having a hub for receiving a fastener extending through the hub and providing a through opening in the guide edge for securing the pulley to the metal guide edge 2006. The method 2000 may further include configuring the hub and the metal guide edge in alignment with one another to receive a fastener for securing the pulley and the guide edge to the closure member 2008. The method 2000 may further include providing an upwardly extending extension from the metal guide edge, and securing a pulley to the upwardly extending extension 2010.

While the above description constitutes a plurality of embodiments of the present invention, it will be appreciated that the present invention is susceptible to further modification and change without departing from the fair meaning of the accompanying claims.

The foregoing description of the embodiments has been provided for purposes of illustration and description. It is not intended to be exhaustive or to limit the disclosure. Individual elements, assemblies, subassemblies, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A window regulator module for a closure member of a motor vehicle, comprising:
a pair of window regulator rails operably coupled to one another via at least one cable wrapped about at least one pulley on each window regulator rail, at least one of the window regulator rails having a body extending lengthwise between opposite upper first and lower second ends, said body of at least one of the pair of window regulator rails having a main body portion and a guide edge extending from the upper first end towards said lower second end, and a lifter that travels along the guide edge upwardly and downwardly, said main body portion being plastic and said guide edge being metal;
said metal guide edge extending outwardly from and exposed from the plastic main body portion, wherein the lifter plate slides along the exposed metal guide edge.

2. The window regulator module of claim 1, wherein said guide edge is configured to be secured to the closure member.

3. The window regulator module of claim 2, wherein said guide edge has a first region extending outwardly from said main body portion and a second region concealed and encapsulated by said main body portion, wherein said second region is configured to be secured to the closure member.

4. The window regulator module of claim 3, wherein said main body portion is over-molded about said second region of said guide edge.

5. The window regulator module of claim 4, wherein said second region comprises at least one through opening for receiving a portion of the over-molded main body portion.

6. The window regulator module of claim 2, wherein said guide edge comprises a through opening for receiving a fastener to secure the guide edge to the closure member, said guide edge configured to extend away from said through opening along an upper partial length of said body.

7. The window regulator module of claim 6, further including at least one pulley coupled to said body for relative rotation therewith, said at least one pulley having a hub extending through the through opening.

8. The window regulator module of claim 7, wherein the hub and the through opening are configured to receive a fastener for securing the pulley and the guide edge to the closure member.

9. The window regulator module of claim 3, further including at least one pulley coupled to said body for relative rotation therewith, said at least one pulley having a hub for receiving a fastener extending through the hub and a through opening in said guide edge for securing the pulley to the guide edge.

10. The window regulator module of claim 9, further including another through opening in said guide edge for receiving another fastener to secure the guide edge to the closure member.

11. The window regulator module of claim 10, wherein the another through opening is provided on the second region of the guide edge, wherein the first region and the second region extend in different planes relative to one another.

12. The window regulator module of claim 3, wherein the second region comprises an upwardly extending extension, said upwardly extending extension having a larger width than a width of the guide edge along which guide edge the lifter travels upwardly and downwardly, wherein said at least one pulley is mounted to the upwardly extending extension.

13. The window regulator module of claim 1, wherein the closure member is a frameless door.

14. The window regulator module of claim 1, wherein the pair of window regulator rails includes a front window regulator rail having a glass run channel extending upwardly therefrom for slidably receiving a window and is not provided with the guide edge, and a rear window regulator rail provided with the guide edge.

15. A window regulator rail for a window regulator module of a closure member of a motor vehicle, comprising:
a body extending longitudinally lengthwise between opposite upper first and lower second ends, said body having a main body portion and a guide edge extending from the upper first end towards said lower second end along an upper partial length of said body, along which guide edge a lifter configured for operable attachment to a window, travels upwardly and downwardly, said main body portion being plastic and said guide edge being metal;
wherein the guide edge and said main body portion are separate pieces of different material, wherein said guide edge and said main body portion are secured together to define the body of the window regulator rail;
wherein the guide edge includes an encapsulated portion disposed within the main body portion and extending longitudinally along the upper partial length of the body, and the guide edge extends laterally out from the main body portion relative to the encapsulated portion to define an exposed portion.

16. The window regulator module of claim 15, wherein said guide edge is configured to be secured to the closure member via a fastener extending through an opening in the encapsulated portion.

17. The window regulator module of claim 16, wherein the closure member is a frameless door.

18. A window regulator comprising:
at least one guide rail;
at least one pulley attached to the at least one guide rail;
wherein the at least one guide rail has a body extending lengthwise between opposite upper and lower ends;
wherein the body includes a main body portion and a guide edge extending from the upper end to the lower end along which a lifter travels upwardly and downwardly;
wherein the main body portion is plastic; and
wherein the guide edge is metal.

19. The window regulator of claim 18, wherein the guide edge extends along a select region of the at least one guide rail, wherein the select region is less than the full length of the at least one guide rail.

20. The window regulator of claim 19, wherein the main body portion is over-molded about the guide edge.

21. The window regulator of claim 20, wherein the main body portion is over-molded about the entirety of the guide edge, wherein the main body portion encapsulates the entirety of the guide edge.

* * * * *